United States Patent
Naganishi et al.

(10) Patent No.: US 11,338,688 B2
(45) Date of Patent: May 24, 2022

(54) VEHICLE CHARGING SYSTEM

(71) Applicant: Yazaki Corporation, Tokyo (JP)

(72) Inventors: Yukinari Naganishi, Shizuoka (JP); Shigeru Tanaka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 22 days.

(21) Appl. No.: 17/153,207

(22) Filed: Jan. 20, 2021

(65) Prior Publication Data

US 2021/0229562 A1 Jul. 29, 2021

(30) Foreign Application Priority Data

Jan. 24, 2020 (JP) .............................. JP2020-009699

(51) Int. Cl.
| | |
|---|---|
| *B60L 53/16* | (2019.01) |
| *B60L 50/50* | (2019.01) |
| *B60L 53/36* | (2019.01) |
| *H01M 10/44* | (2006.01) |
| *B60K 1/04* | (2019.01) |

(52) U.S. Cl.
CPC ................ *B60L 53/16* (2019.02); *B60K 1/04* (2013.01); *B60L 50/50* (2019.02); *B60L 53/36* (2019.02); *H01M 10/44* (2013.01)

(58) Field of Classification Search
CPC .......... B60L 53/16; B60L 53/36; B60L 50/50; H01M 10/44
USPC ......................................................... 320/109
See application file for complete search history.

(56) References Cited

U.S. PATENT DOCUMENTS

| | | | |
|---|---|---|---|
| 9,419,453 B2 * | 8/2016 | Andersson ............ | H02J 7/0042 |
| 2013/0076902 A1 * | 3/2013 | Gao ........................ | B60L 53/35 |
| | | | 348/148 |
| 2020/0189405 A1 * | 6/2020 | Westfall .................. | B60L 53/30 |

FOREIGN PATENT DOCUMENTS

| | | | |
|---|---|---|---|
| JP | S62-245603 A | 10/1987 | |
| JP | H08-017538 A | 1/1996 | |
| JP | 2011-050177 A | 3/2011 | |

* cited by examiner

*Primary Examiner* — Nathaniel R Pelton
(74) *Attorney, Agent, or Firm* — Banner & Witcoff, Ltd.

(57) ABSTRACT

A vehicle charging system includes a second fitting body. The second fitting body includes a projection-side electrode holding unit which includes a projection, the projection holding a second electrode member and projecting in a facing direction, and an elastic body which supports the projection-side electrode holding unit in the facing direction and is elastically deformable in a compression direction which is one direction of the facing direction. The elastic body moves the projection-side electrode holding unit in the compression direction from an initial position by being compressed by a load in the compression direction applied to the projection-side electrode holding unit and moves the projection-side electrode holding unit to the initial position by being restored when the load is removed.

9 Claims, 11 Drawing Sheets

FIG.1
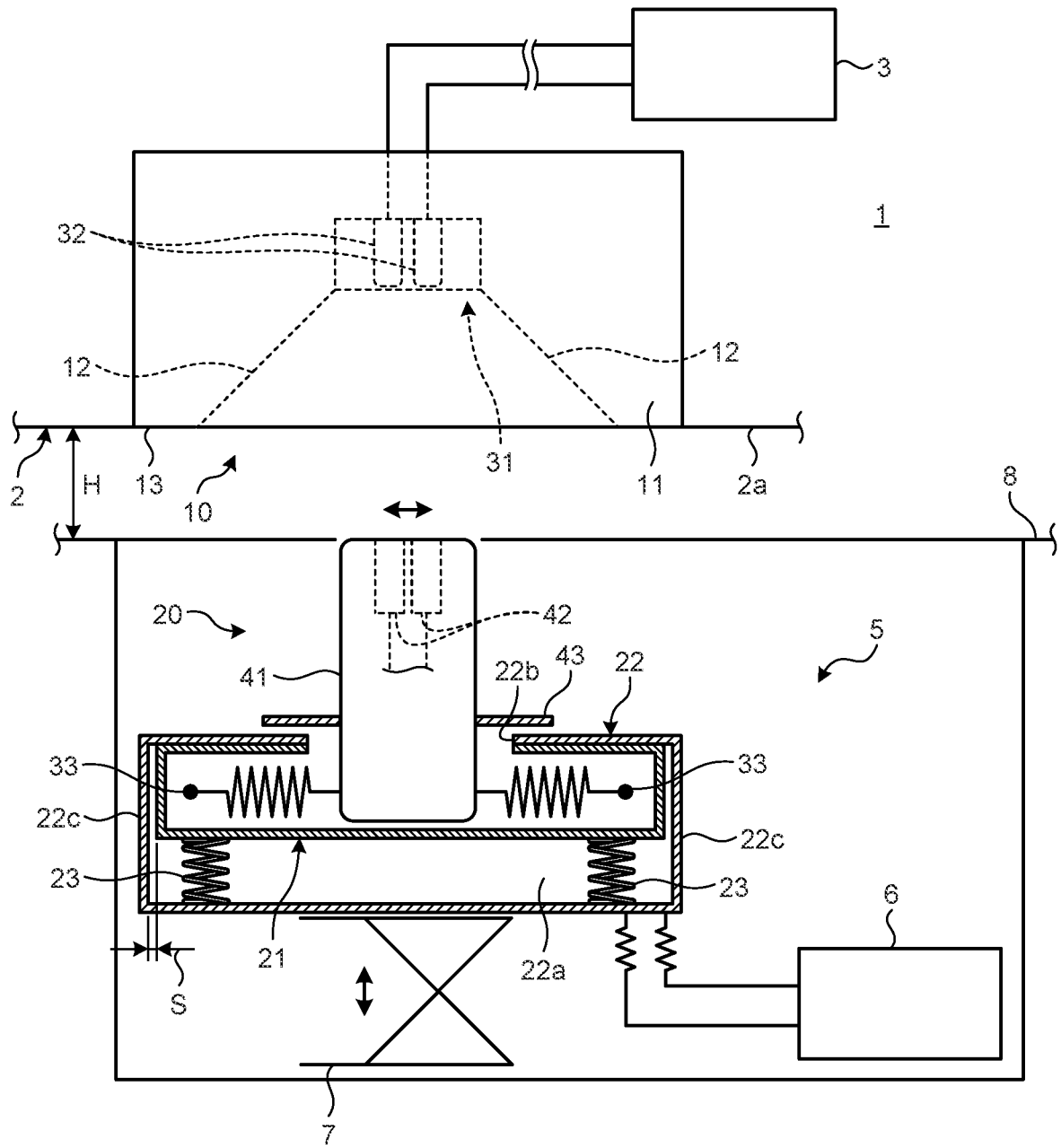
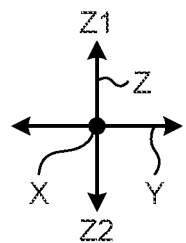

FIG.2
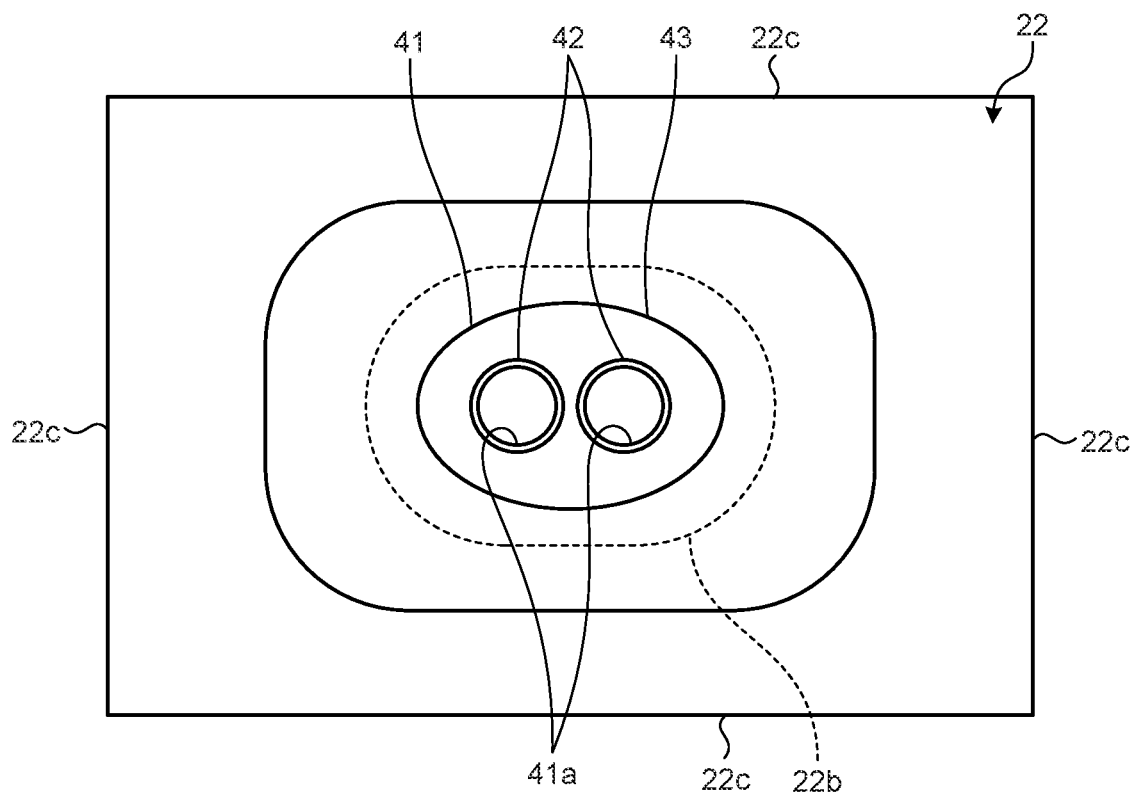
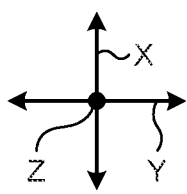

FIG.5
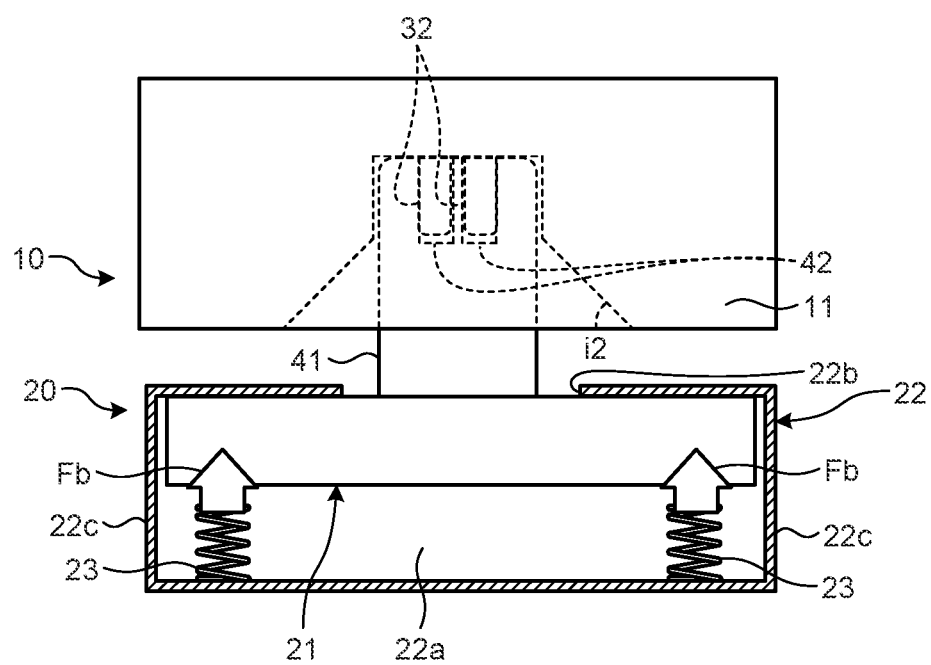
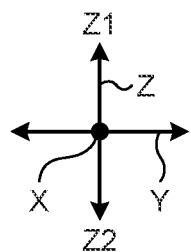

FIG.7
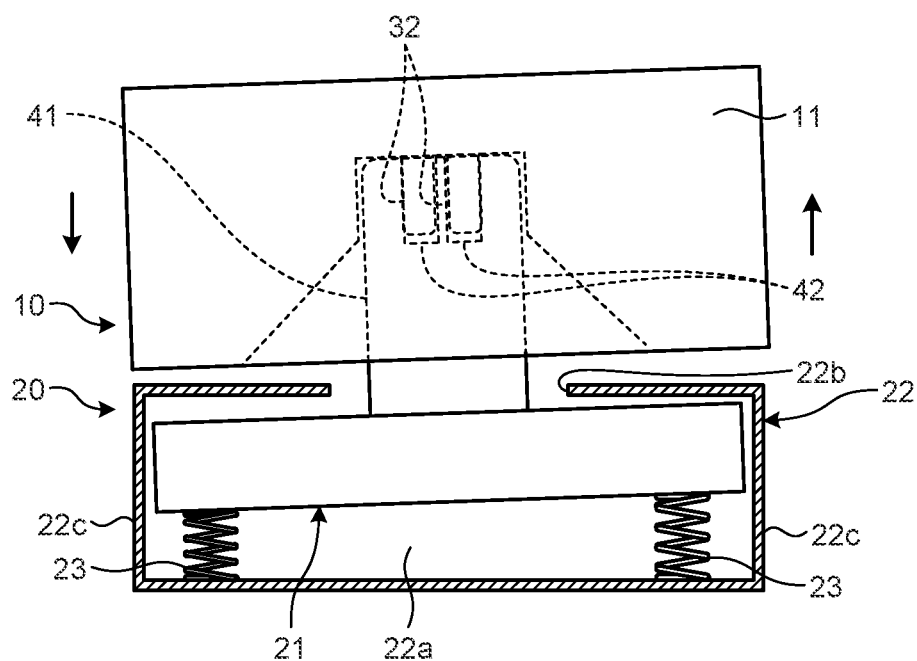
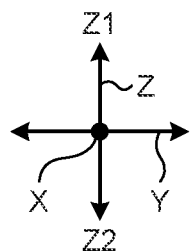

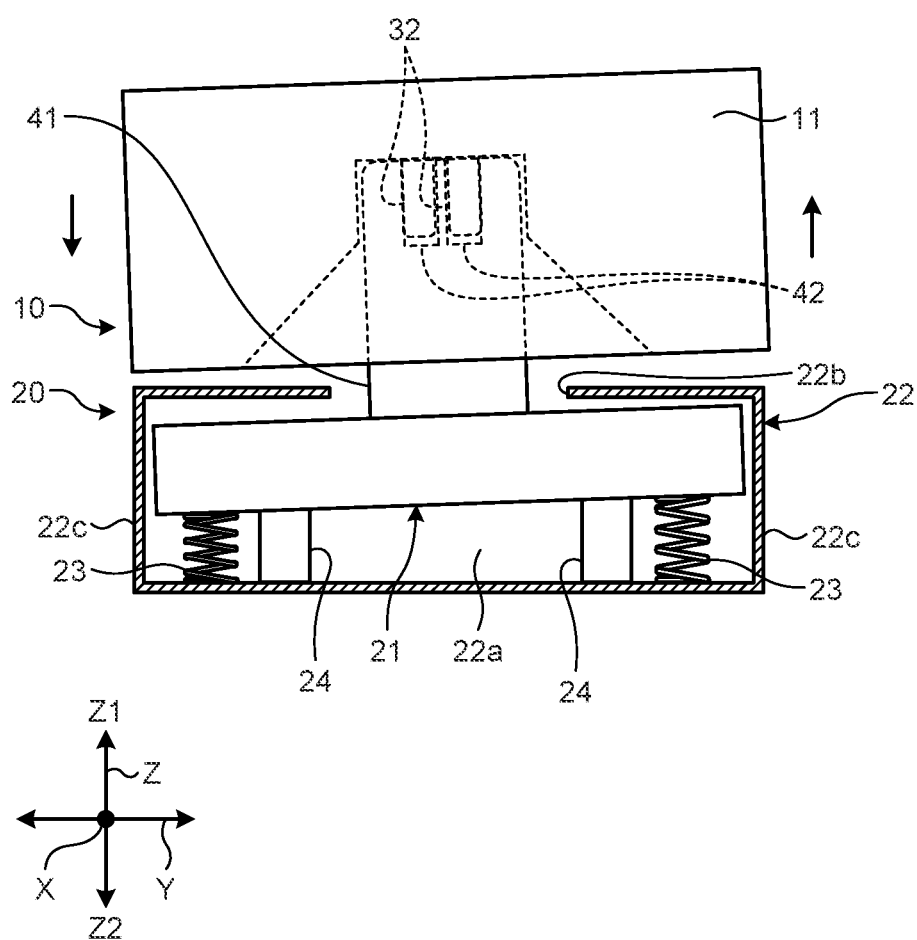

VEHICLE CHARGING SYSTEM

CROSS-REFERENCE TO RELATED APPLICATION(S)

The present application claims priority to and incorporates by reference the entire contents of Japanese Patent Application No. 2020-009699 filed in Japan on Jan. 24, 2020.

BACKGROUND OF THE INVENTION

1. Field of the Invention

The present invention relates to a vehicle charging system.

2. Description of the Related Art

A conventional vehicle charging system fits a coupler at a power feeding side to an inlet at a power receiving side, the inlet being mounted on a vehicle such as an electric vehicle, in an unattended manner or automatically to perform charging. For example, Japanese Patent Application Laid-open No. H8-17538 discloses an automatic power feeding apparatus in which a power receiving connector of a movable body that freely moves on a floor surface automatically checks the position of a power feeding connector fixed to, for example, a building. Japanese Patent Application Laid-open No. 2011-50177 discloses a charging apparatus that recognizes misalignment between the position of a power receiving coupler of a vehicle and the position of a power feeding coupler of the charging apparatus by image processing and moves the power feeding coupler of the charging apparatus so as to be aligned with the position of the power receiving coupler, thereby reducing the misalignment between the power receiving coupler and the power feeding coupler in the X-Y direction. Japanese Patent Application Laid-open No. S62-245603 discloses an automatic charging apparatus including a guide body disposed near a charged-side connector and an insertion body mounted on a power supply body. The guide body includes a guide opening that is formed in a tapered shape having an opening area gradually decreasing from an opening end face toward a deeper side. The insertion body comes into contact with the guide opening and moves along the tapered surface.

Incidentally, when a coupler at the power feeding side is automatically raised by an elevator and fitted to an inlet at the power receiving side, it is necessary to raise the coupler until an electrode of the inlet and an electrode of the coupler are brought into contact with each other. Thus, for example, a height to a connection position where the coupler raised from a standby position under the ground surface is connected to the inlet and the electrodes are brought into the contact state in a state where a sufficient minimum ground clearance of a vehicle is ensured is set as a reference height.

However, for example, when the minimum ground clearance is reduced due to a change in the vehicle weight, the positional relationship in the height direction between the standby position and the connection position changes. Thus, when the contact state between the electrodes cannot be maintained, stable charging of the vehicle may not be performed. Thus, for example, a method that measures the minimum ground clearance of the vehicle by using, for example, a distance sensor and adjusts the height of the elevator may be considered. However, this method increases cost due to an increase in the number of components and addition of assembly operations.

SUMMARY OF THE INVENTION

The present invention has been made in view of the above problems, and an object thereof is to provide a vehicle charging system capable of reducing noise or damage that occurs in correction of misalignment between a first fitting body and a second fitting body and smoothly performing fitting between the first fitting body and the second fitting body.

A vehicle charging system according to one aspect of the present invention includes a first fitting body including a first electrode member; a second fitting body including a second electrode member connectable to the first electrode member in a state where the second fitting body is fitted with the first fitting body; a support unit configured to support the second fitting body movably in a plane direction within a predetermined range from a reference position in response to application of an external force to the second fitting body and return the second fitting body to the reference position in response to removal of the external force; and an elevating unit configured to move the second fitting body from a standby position to a connection position in a state where the first fitting body and the second fitting body face each other in a facing direction perpendicular to the plane direction to fit the second fitting body to the first fitting body, wherein one of the first fitting body and the second fitting body is mounted on a vehicle, another one of the first fitting body and the second fitting body is disposed at a position facing the one fitting body in the facing direction when the vehicle is stopped, the other fitting body includes a projection-side electrode holding unit including a projection, the projection holding one of the first electrode member and the second electrode member inside the projection and projecting in the facing direction facing the one fitting body, and an elastic body supporting the projection-side electrode holding unit in the facing direction and elastically deformable in a compression direction, the compression direction being one direction of the facing direction, the one fitting body includes a recess-side electrode holding unit including a recess, the recess being recessed in a direction opposite to the compression direction, including the other of the first electrode member and the second electrode member disposed inside the recess, and being configured to receive the projection of the projection-side electrode holding unit, and the elastic body moves the projection-side electrode holding unit in the compression direction from an initial position by being compressed by a load in the compression direction applied to the projection-side electrode holding unit and moves the projection-side electrode holding unit to the initial position by being restored when the load is removed.

According to another aspect of the present invention, in the vehicle charging system, it is preferable that the other fitting body includes a damping body, the damping body supporting the projection-side electrode holding unit in the facing direction and being configured to damp compression of the elastic body in the compression direction and extension of the elastic body in the direction opposite to the compression direction.

According to still another aspect of the present invention, in the vehicle charging system, it is preferable that the other fitting body includes a housing including a housing space, the housing space communicating with outside through an opening opened in the facing direction facing the one fitting body and housing the projection-side electrode holding unit in an inserted state where a tip of the projection is inserted through the opening, and the housing allows movement of the projection-side electrode holding unit in the facing direction and restricts movement of the projection-side electrode holding unit in the plane direction.

According to still another aspect of the present invention, in the vehicle charging system, it is preferable that a clearance is left between the projection-side electrode holding unit and the housing in the plane direction so as to allow the projection-side electrode holding unit to tilt with respect to the facing direction.

According to still another aspect of the present invention, in the vehicle charging system, it is preferable that the one fitting body includes a guide surface, the guide surface being coupled to the recess, being inclined to a side opposite to the recess in the plane direction as extending in the compression direction, and being configured to guide the projection to the recess.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram illustrating the schematic configuration of a vehicle charging system according to a first embodiment;

FIG. 2 is a plan view illustrating the schematic configuration of a second fitting body in the first embodiment;

FIG. 5 is a schematic diagram illustrating a fitted state of the first fitting body and the second fitting body in the first embodiment;

FIG. 7 is a schematic diagram illustrating a fitted state of the first fitting body and the second fitting body when a projection-side electrode holding unit tilts in the first embodiment;

FIG. 11 is a schematic diagram illustrating a fitted state of the first fitting body and the second fitting body when a projection-side electrode holding unit tilts in the second embodiment.

DETAILED DESCRIPTION OF THE PREFERRED EMBODIMENTS

Hereinbelow, embodiments of a vehicle charging system according to the present invention will be described in detail with reference to the drawings. Note that the present invention is not limited to the embodiments described below. Elements in the following embodiments include elements readily conceivable by those skilled in the art or substantially identical elements. Furthermore, various omissions, replacements, and modifications of the elements in the following embodiments can be performed without departing from the gist of the invention.

First Embodiment

Figure 3:
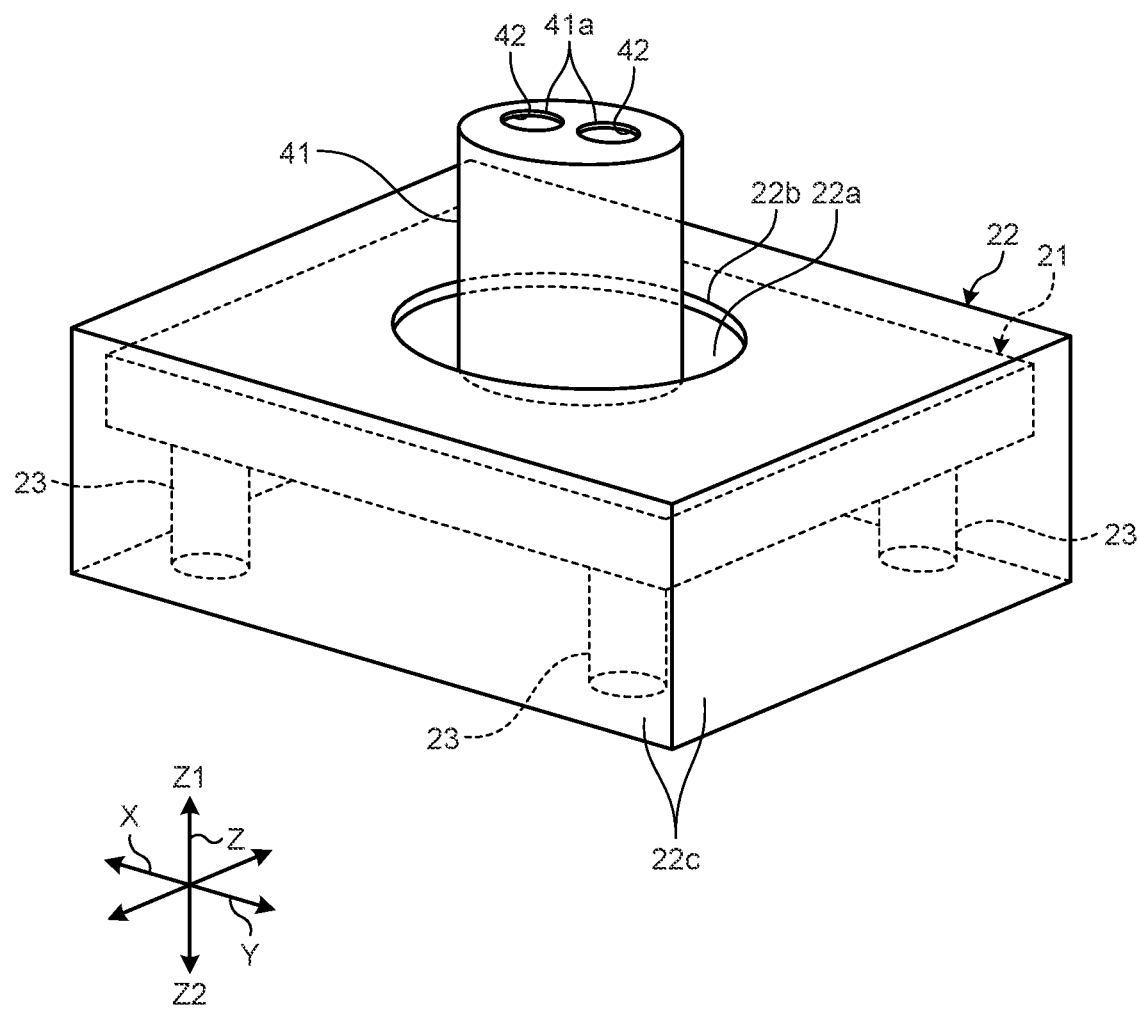
FIG. 3 is a perspective view illustrating the schematic configuration of the second fitting body in the first embodiment.
Figure 4:
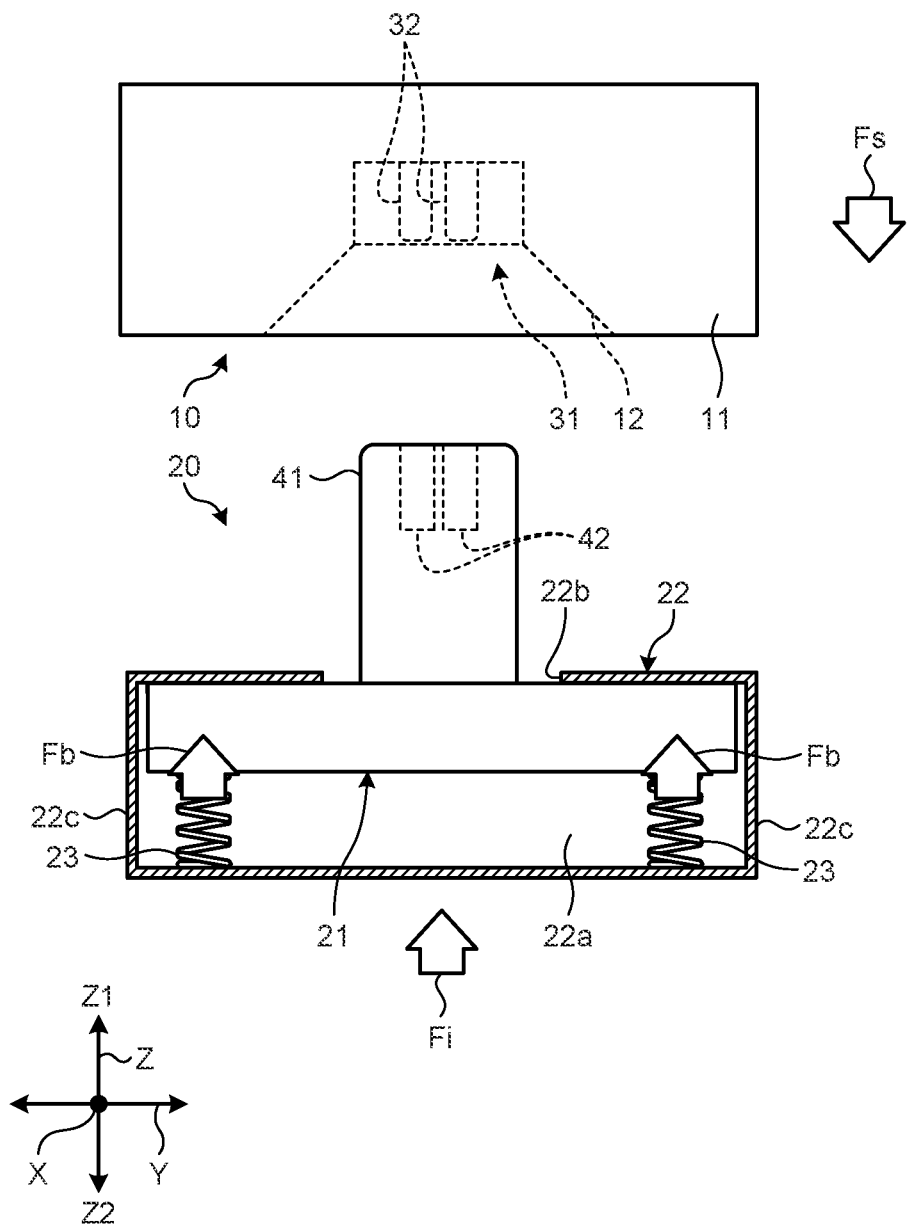
FIG. 4 is a schematic diagram illustrating an example of a state before a first fitting body and the second fitting body are fitted with each other in the first embodiment.
Figure 6:
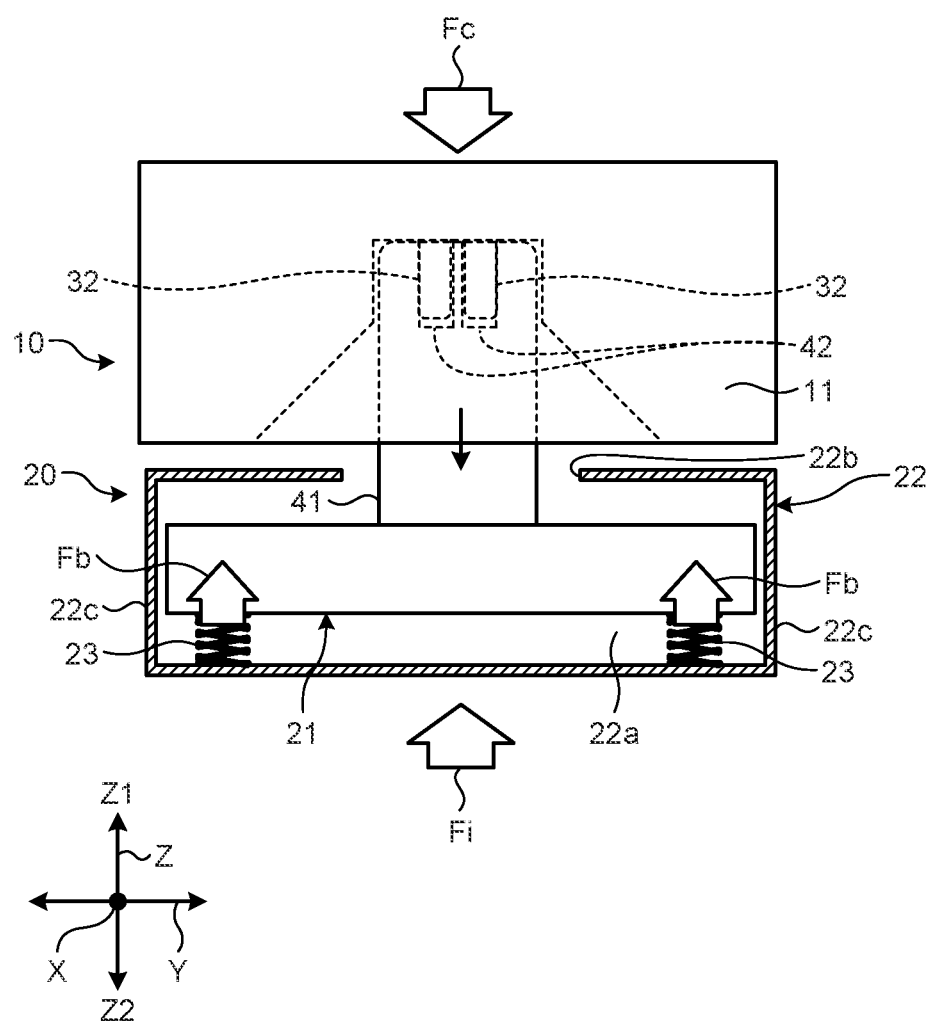
FIG. 6 is a schematic diagram illustrating a fitted state of the first fitting body and the second fitting body when elastic bodies are compressed in the first embodiment.

A vehicle charging system according to a first embodiment will be described with reference to FIGS. 1 to 7. FIG. 1 is a schematic diagram illustrating the schematic configuration of the vehicle charging system according to the first embodiment. FIG. 2 is a plan view illustrating the schematic configuration of a second fitting body in the first embodiment. FIG. 3 is a perspective view illustrating the schematic configuration of the second fitting body in the first embodiment. FIG. 4 is a schematic diagram illustrating an example of a state before a first fitting body and the second fitting body are fitted with each other in the first embodiment. FIG. 5 is a schematic diagram illustrating a fitted state of the first fitting body and the second fitting body in the first embodiment. FIG. 6 is a schematic diagram illustrating a fitted state of the first fitting body and the second fitting body when elastic bodies are compressed in the first embodiment. FIG. 7 is a schematic diagram illustrating a fitted state of the first fitting body and the second fitting body when a projection-side electrode holding unit tilts in the first embodiment. Note that a side plate 43 illustrated in FIGS. 1 and 2 is not illustrated in FIGS. 3 to 7 (also in FIGS. 8 to 11).

In the following description, an X direction in FIGS. 1 to 7 (also in FIGS. 8 to 11) is a width direction of a vehicle in the present embodiment, unless otherwise specifically noted. A Y direction is a front-rear direction of the vehicle in the present embodiment and perpendicular to the width direction. A Z direction is an up-down direction of the vehicle in the present embodiment and perpendicular to the width direction and the front-rear direction. The X direction, the Y direction, and the Z direction are perpendicular to each other. Note that, for the sake of convenience, in the Z direction, a Z1 direction is defined as an upward direction, and a Z2 direction is defined as a downward direction. The Z direction corresponds to, for example, a vertical direction of the vehicle.

As illustrated in FIG. 1, the vehicle charging system 1 fits a second fitting body 20 of a charging apparatus 5 to a first fitting body 10 of a vehicle 2 by raising the second fitting body 20 from a standby position to a connection position by using an elevating unit 7 in a stop state where the vehicle 2 is stopped at a stop position. The vehicle charging system 1 in the present embodiment is applied to the vehicle 2 and the charging apparatus 5. The vehicle charging system 1 includes the elevating unit 7, the first fitting body 10, the second fitting body 20, and a support unit 33. The first fitting body 10 is mounted on the vehicle 2. The elevating unit 7, the second fitting body 20, and the support unit 33 are mounted on the charging apparatus 5.

The vehicle 2 drives a motor (not illustrated) by using electric power supplied from a battery 3, which is a rechargeable storage battery, and travels using the motor as a part or the whole of a power source. The vehicle 2 is, for example, an electric vehicle (EV), a hybrid electric vehicle (HEV), or a plug-in hybrid electric vehicle (PHEV). In a fitted state where the first fitting body 10 and the second fitting body 20 are fitted with each other, the battery 3 is electrically connected to the charging apparatus 5 and charged with electric power supplied from the charging apparatus 5. The vehicle 2 has a so-called minimum ground clearance H between a bottom 2a thereof and a ground surface 8 in the up-down direction. The bottom 2a is the lowest part of the vehicle 2. For example, the minimum ground clearance H is defined as 9 cm or larger for motor vehicles including regular passenger cars in the safety standards.

The charging apparatus 5 is installed in, for example, a parking lot for a user who uses the vehicle 2 and automatically charges the vehicle 2 stopped at the stop position in the parking lot. The stop position is, for example, a position where the first fitting body 10 and the second fitting body 20 face each other in a facing direction when the vehicle 2 is stopped. The facing direction is the up-down direction of the vehicle 2. The charging apparatus 5 is installed below the ground surface 8. The charging apparatus 5 includes a charging unit 6 which is electrically connected to the second fitting body 20. The charging unit 6 is connected to an external power source (not illustrated) including a commercial power source. The charging unit 6 converts AC power supplied from the external power source to DC power suitable for charging the battery 3 inside the vehicle 2 and controls the charging of the battery 3 in the fitted state where the first fitting body 10 and the second fitting body 20 are fitted with each other.

The elevating unit 7 moves the second fitting body 20 from the standby position to the connection position in a state where the first fitting body 10 and the second fitting body 20 face each other in the facing direction to fit the second fitting body 20 to the first fitting body 10. As illustrated in FIG. 1, the standby position of the second fitting body 20 is, for example, a position where the upper end of the second fitting body 20 does not project from the ground surface 8. The connection position between the first fitting body 10 and the second fitting body 20 is, for example, a position where a first electrode member 32 inside the first fitting body 10 and a second electrode member 42 inside the second fitting body 20 are physically and electrically connected to each other in the fitted state where the elevating unit 7 rises to a previously-set height and the first fitting body 10 and the second fitting body 20 are fitted with each other. The connection position is set on the basis of, for example, the minimum ground clearance H of the vehicle. The minimum ground clearance H may vary according to, for example, the type of the vehicle. Thus, the connection position of the present embodiment is set on the basis of the minimum ground clearance H specific to the vehicle 2. The elevating unit 7 is electrically connected to a control unit (not illustrated) and driven in accordance with, for example, a control signal received from the control unit. The elevating unit 7 includes an elevating mechanism which includes an actuator and a sensor (both not illustrated) and raises and lowers the second fitting body 20 by using the elevating mechanism in accordance with a control signal from the control unit. For example, in a case where the elevating mechanism of the elevating unit 7 is a pantograph, the second fitting body 20 is disposed at one end side, in an extension and contraction direction, of the pantograph.

The first fitting body 10 is, for example, an inlet and fittable with the second fitting body 20. The first fitting body 10 is mounted on the bottom 2a of the vehicle 2 and located above the second fitting body 20 in the stop state. The first fitting body 10 includes, for example, an insulating synthetic resin material. The first fitting body 10 includes a recess-side electrode holding unit 11, a guide surface 12, and the first electrode member 32.

The recess-side electrode holding unit 11 includes a recess 31. The recess 31 is recessed in a direction opposite to a compression direction which is one direction of the facing direction, and the first electrode member 32 is disposed inside the recess 31. The recess 31 is formed in a shape recessed toward the inside of the first fitting body 10. A projection 41 of a projection-side electrode holding unit 21 included in the second fitting body 20 is inserted in the recess 31 in the fitted state where the first fitting body 10 and the second fitting body 20 are fitted with each other. The recess 31 is formed at a position deep into the vehicle 2 relative to the bottom 2a. The recess 31 has an elliptical (or oval) shape whose diameter is longer in the front-rear direction than in the width direction when viewed from below.

The guide surface 12 includes an upper end coupled to the recess 31 and is inclined to the side opposite to the recess 31 in a plane direction as extending in the compression direction. The guide surface 12 guides the projection 41 to the recess 31. The plane direction is perpendicular to the facing direction. The guide surface 12 includes a lower end coupled to the bottom 2a of the vehicle 2 through an opening 13. The guide surface 12 constitutes a so-called truncated elliptical cone (or a truncated cone) in a three-dimensional view.

The first electrode member 32 is, for example, a pair of male electrode terminals each of which is formed in a columnar shape (or a cylindrical shape). The first electrode member 32 extends in the facing direction and is substantially entirely exposed to the outside except one end thereof. The one end of the first electrode member 32 is electrically connected to the battery 3 inside the vehicle 2 through, for example, a cable. The first electrode member 32 includes, for example, a conductive metal material (e.g., copper or a copper alloy). For example, a part of the first electrode member 32, the part being exposed to the outside in the facing direction, has a length substantially equal to or shorter than the depth, in the facing direction, of the recess 31.

The second fitting body 20 is, for example, a coupler and fittable with the first fitting body 10. The second fitting body 20 is disposed at a position facing the first fitting body 10 in the facing direction when the vehicle 2 is stopped. The second fitting body 20 is relatively movable in the facing direction through the elevating unit 7 in the stop state. The second fitting body 20 includes, for example, an insulating synthetic resin material. The second fitting body 20 includes the projection-side electrode holding unit 21, a housing 22, an elastic body 23, the support unit 33, and the second electrode member 42.

The projection-side electrode holding unit 21 includes the projection 41 which holds the second electrode member 42 inside thereof and projects in the facing direction facing the first fitting body 10. The projection 41 is formed in a shape projecting outward from the second fitting body 20 and inserted in the recess 31 of the recess-side electrode holding unit 11 in the fitted state where the first fitting body 10 and the second fitting body 20 are fitted with each other. The projection 41 is disposed below the ground surface 8. As illustrated in FIG. 2, the projection 41 has an elliptical (or oval) shape whose diameter is longer in the front-rear direction than in the width direction when viewed from above. The projection 41 is smaller than the recess 31 in the diameter in the width direction and the diameter in the front-rear direction. The projection 41 includes the side plate 43 which covers an opening 22b of the housing 22. The side plate 43 is disposed facing the housing 22 in the vertical direction outside the housing 22 in an inserted state where the projection 41 is inserted in the opening 22*b* of the housing 22. The side plate 43 extends in a radial direction from an outer peripheral face of the projection 41. The side plate 43 covers the opening 22*b* when viewed in the facing direction no matter where the projection 41 is located within a movable range within which the projection 41 is movable through the support unit 33. The movable range of the projection 41 is defined by the size of the opening 22*b* in the inserted state described above.

The housing 22 includes a housing space 22*a* which communicates with the outside through the opening 22*b* which is open in the facing direction facing the first fitting body 10 and houses the projection-side electrode holding unit 21 in the inserted state where the tip of the projection 41 is inserted through the opening 22*b*. As illustrated in FIG. 2, the opening 22*b* has an elliptical (or oval) shape whose diameter is longer in the front-rear direction than in the width direction when viewed from above. The projection 41 is inserted in the opening 22*b* in the facing direction in a housed state where the projection-side electrode holding unit 21 is housed in the housing space 22*a*. The opening 22*b* allows movement of the projection 41 in the plane direction and also restricts movement of the projection 41 in the plane direction. For example, the opening 22*b* enables the projection 41 to move in the plane direction within a predetermined range from a reference position. The reference position is, for example, a position where the second fitting body 20 faces the first fitting body 10 in the facing direction in a parking state where a wheel of the vehicle 2, which is a specific vehicle, abuts against a car stop in the parking lot where the charging apparatus 5 is installed. The predetermined range is a range that enables the projection 41 to come into contact with the guide surface 12 without fail when the second fitting body 20 rises toward the first fitting body 10, taking into consideration a case where the first fitting body 10 is displaced in the plane direction from the reference position in the parking state of the vehicle 2. Thus, the shape and the size of the opening 22*b* in the plane direction are set so that, even when the projection 41 moves in the plane direction, the projection 41 comes into contact with the guide surface 12 without fail. The housing 22 allows movement of the projection-side electrode holding unit 21 in the facing direction and restricts movement of the projection-side electrode holding unit 21 in the plane direction.

The housing 22 includes a wall 22*c* which extends in the facing direction and surrounds the projection-side electrode holding unit 21 and allows movement of the projection-side electrode holding unit 21 in the facing direction through the wall 22*c*. Moreover, the wall 22*c* of the housing 22 restricts movement of the projection-side electrode holding unit 21 in the plane direction. A clearance S is left between the projection-side electrode holding unit 21 and the housing 22 in the plane direction so as to allow the projection-side electrode holding unit 21 to tilt with respect to the facing direction (FIG. 1). When the vehicle 2 tilts in the front-rear direction or the width direction, the first fitting body 10 also tilts in the front-rear direction or the width direction together with the vehicle 2. Thus, when the first fitting body 10 tilts in the fitted state where the first fitting body 10 and the second fitting body 20 are fitted with each other, the projection-side electrode holding unit 21 including the projection 41 tilts in response to the tilt of the first fitting body 10 because the projection 41 is inserted in the recess 31. Thus, for example, the clearance S which allows the projection-side electrode holding unit 21 to tilt by a certain amount in the front-rear direction or the width direction is left between the projection-side electrode holding unit 21 and the housing 22 in the plane direction. When the projection-side electrode holding unit 21 tilts by more than the certain amount, the projection-side electrode holding unit 21 comes into contact with the wall 22*c* of the housing 22, which suppresses the tilt.

The elastic body 23 is housed in the housing space 22*a*, supports the projection-side electrode holding unit 21 in the facing direction, and is elastically deformable in the compression direction which is one direction of the facing direction. For example, a plurality of elastic bodies 23 are disposed between the projection-side electrode holding unit 21 and the housing 22 in the facing direction in the housing space 22*a*. For example, the elastic bodies 23 are disposed on diagonal lines on an inner bottom face of the housing 22. The elastic body 23 is, for example, a metal coil spring. An end, in the compression direction, of the elastic body 23 is fixed to the inner bottom face of the housing 22, and an end, in the direction opposite to the compression direction, of the elastic body 23 is fixed to an outer bottom face of the projection-side electrode holding unit 21. The elastic body 23 moves the projection-side electrode holding unit 21 in the compression direction from an initial position by being compressed by a load in the compression direction applied to the projection-side electrode holding unit 21 and moves the projection-side electrode holding unit 21 to the initial position by being restored when the load is removed. As illustrated in FIG. 5, the initial position is the position of the projection-side electrode holding unit 21 in a state where the projection-side electrode holding unit 21 abuts against an inner upper face of the housing 22 in the facing direction.

The support unit 33 supports the second fitting body 20 movably in the plane direction within the predetermined range from the reference position in response to application of an external force to the second fitting body 20 and returns the second fitting body 20 to the reference position in response to removal of the external force. The support unit 33 is housed in a housing space inside the projection-side electrode holding unit 21. The support unit 33 moves the projection 41 in the plane direction relative to the first fitting body 10. The support unit 33 includes, for example, metal coil springs which are disposed on the projection 41 at both ends in the width direction (X direction) and both ends in the front-rear direction (Y direction).

The second electrode member 42 is, for example, a pair of female electrode terminals each of which is formed in a cylindrical shape. The second electrode member 42 extends in the facing direction, and one end of the second electrode member 42 is electrically connected to the charging unit 6 through, for example, a cable. The second electrode member 42 includes, for example, a conductive metal material (e.g., copper or a copper alloy) as with the first electrode member 32. The second electrode member 42 is housed inside the projection 41 together with the cable through an opening 41*a* formed on an upper end of the projection 41.

Next, an operation of fitting the first fitting body 10 and the second fitting body 20 and a fitted state of the first fitting body 10 and the second fitting body 20 when the elastic bodies are compressed in the vehicle charging system 1 of the first embodiment will be described with reference to FIGS. 4 to 7.

When the vehicle 2 is stopped at the stop position, the elevating unit 7 moves the second fitting body 20 upward. The elevating unit 7, for example, starts driving in accordance with a control signal received from the control unit to raise the second fitting body 20 (FIG. 4). In a case where the second fitting body 20 is misaligned with respect to the first fitting body 10 in the plane direction, the projection 41 comes into contact with the guide surface 12 when the second fitting body 20 rises. When the second fitting body 20 further rises, the projection 41 moves toward the recess 31 along the guide surface 12. At this time, the projection 41 moves in the plane direction by a component force in the plane direction among forces in the upward direction applied to the second fitting body 20. As a result, the projection 41 is guided to the recess 31 along the guide surface 12.

When fitting of the second fitting body 20 to the first fitting body 10 is started, an apparatus-side load Fi in the upward direction is generated on the second fitting body 20. A spring repulsive force Fb in the upward direction is generated on each of the elastic bodies 23 of the second fitting body 20 in a state where the projection-side electrode holding unit 21 abuts against the inner upper face of the housing 22. When the second fitting body 20 is fitted to the first fitting body 10, a fitting force Fs in the downward direction (compression direction) is generated against the apparatus-side load Fi. At this time, Fs<Fb is satisfied between the fitting force Fs and the spring repulsive force Fb. Thus, the projection-side electrode holding unit 21 does not move in the compression direction, and the second fitting body 20 is fitted to the first fitting body 10.

In response to the insertion of the projection 41 into the recess 31, the first electrode member 32 and the second electrode member 42 start making contact with each other. When the second fitting body 20 finishes rising, the insertion of the projection 41 into the recess 31 is completed. As a result, the second fitting body 20 is fitted to the first fitting body 10, and connection between the first electrode member 32 and the second electrode member 42 is completed (FIG. 5). When the control unit of the charging apparatus 5 detects the electrical connection between the first electrode member 32 and the second electrode member 42 and detects ignition OFF of the vehicle 2, the control unit starts charging the battery 3 of the vehicle 2.

For example, when the weight of the vehicle 2 is increased by loading a load having a weight on the vehicle 2 during charging of the vehicle 2, a load Fc from the vehicle 2 increases, which lowers the first fitting body 10 in the compression direction (FIG. 6). The apparatus-side load Fi and the spring repulsive force Fb remain unchanged before and after the increase in the vehicle weight. Thus, each of the elastic bodies 23 is compressed by the load Fc, which moves the projection-side electrode holding unit 21 in the compression direction from the initial position. In this manner, even if the increase in the vehicle weight reduces the minimum ground clearance H of the vehicle 2 and displaces the connection position between the first fitting body 10 and the second fitting body 20 in the downward direction (compression direction) of the up-down direction (facing direction), it is possible to maintain the contact state between the electrode member of the first fitting body 10 and the electrode member of the second fitting body 20 by the projection-side electrode holding unit 21 moving in the compression direction from the initial position. Furthermore, since only the projection-side electrode holding unit 21 moves in the compression direction in the second fitting body 20, it is possible to prevent crush between the first fitting body 10 and the second fitting body 20 and prevent breakdown or damage by suppressing a load in the compression direction applied to the elevating unit 7.

When the vehicle 2 tilts in the front-rear direction or the width direction in the fitted state where the first fitting body 10 and the second fitting body 20 are fitted with each other, the first fitting body 10 also tilts in the front-rear direction or the width direction together with the vehicle 2. For example, when the first fitting body 10 tilts in the front-rear direction, loads in different directions are applied to the projection-side electrode holding unit 21 including the projection 41 at front and rear thereof in response to the tilt because the projection 41 is inserted in the recess 31. In this case, a load in the compression direction is generated at the front end of the projection-side electrode holding unit 21, and, on the other hand, a load in the direction opposite to the compression direction is generated at the rear end of the projection-side electrode holding unit 21. As a result, among the four elastic bodies 23 disposed between the projection-side electrode holding unit 21 and the housing 22, the two elastic bodies 23 disposed at the front side are compressed by the load in the compression direction, and, on the other hand, the two elastic bodies 23 disposed at the rear side are extended by the load in the direction opposite to the compression direction. Accordingly, when the vehicle 2 tilts in the fitted state, among the plurality of elastic bodies 23, the elastic bodies 23 located at one side in the tilt direction are compressed, and the elastic bodies 23 located at the other side are extended. Thus, only the projection-side electrode holding unit 21 tilts in response to the tilt of the first fitting body 10. Therefore, it is possible to maintain the contact state between the electrode member of the first fitting body 10 and the electrode member of the second fitting body 20.

The vehicle charging system 1 according to the first embodiment described above includes the second fitting body 20 including the projection-side electrode holding unit 21 which includes the projection 41 which holds the second electrode member 42 and projects in the facing direction, the housing 22 which includes the housing space 22a which houses the projection-side electrode holding unit 21, and the elastic body 23 which is housed in the housing space 22a, supports the projection-side electrode holding unit 21 in the facing direction, and is elastically deformable in the compression direction which is one direction of the facing direction. The elastic body 23 moves the projection-side electrode holding unit 21 in the compression direction from the initial position by being compressed by the load in the compression direction applied to the projection-side electrode holding unit 21 and moves the projection-side electrode holding unit 21 to the initial position by being restored when the load is removed.

With the above configuration, for example, even if the positional relationship in the facing direction between the standby position and the connection position of the second fitting body 20 changes due to a reduction in the minimum ground clearance H of the vehicle 2, the elastic body 23 is compressed through the projection-side electrode holding unit 21 by the load in the compression direction during fitting, which moves the projection-side electrode holding unit 21 in the compression direction from the initial position. Thus, it is possible to maintain the contact state between the electrode member of the first fitting body 10 and the electrode member of the second fitting body 20. As a result, the vehicle 2 can be stably charged. Moreover, it is possible to release the loads applied to the respective fitting bodies (10, 20), thereby preventing damage of the fitting bodies (10, 20). Furthermore, since the structure is simple, cost-up can be suppressed compared to a case where a distance sensor or the like is additionally provided.

Furthermore, in the vehicle charging system 1 according to the present embodiment, the clearance S is left between the projection-side electrode holding unit 21 and the housing 22 in the plane direction so as to allow the projection-side electrode holding unit 21 to tilt with respect to the facing direction. Thus, although, when the vehicle 2 tilts in the fitted state, the projection-side electrode holding unit 21 including the projection 41 tilts in response to the tilt of the vehicle 2 because the projection 41 is inserted in the recess 31, the projection-side electrode holding unit 21 does not immediately come into contact with the wall 22c of the housing 22 and is allowed to tilt by the certain amount. As a result, since the projection-side electrode holding unit 21 tilts in response to the tilt of the first fitting body 10, it is possible to maintain the contact state between the electrode member of the first fitting body 10 and the electrode member of the second fitting body 20.

Second Embodiment

Figure 8:
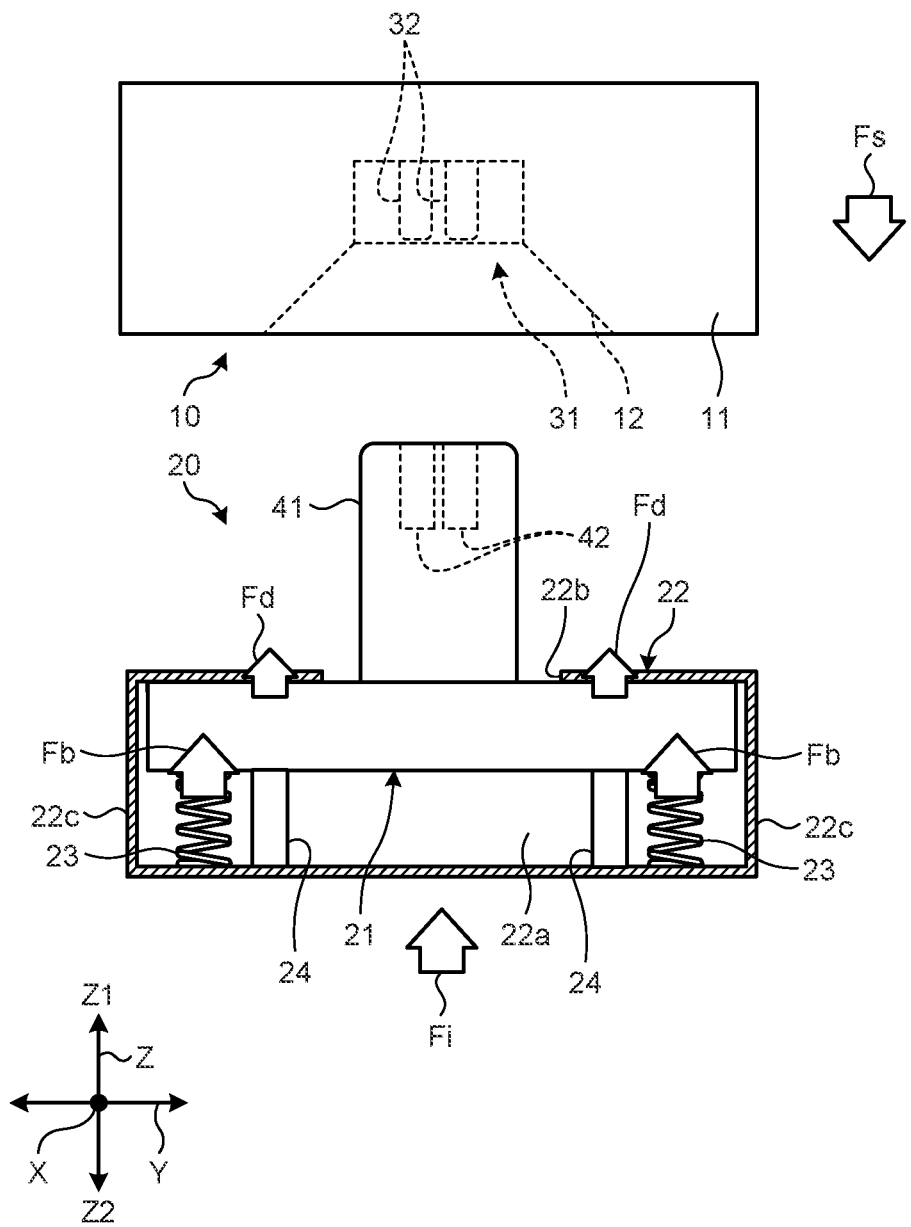
FIG. 8 is a schematic diagram illustrating the schematic configuration of a vehicle charging system according to a second embodiment.
Figure 9:
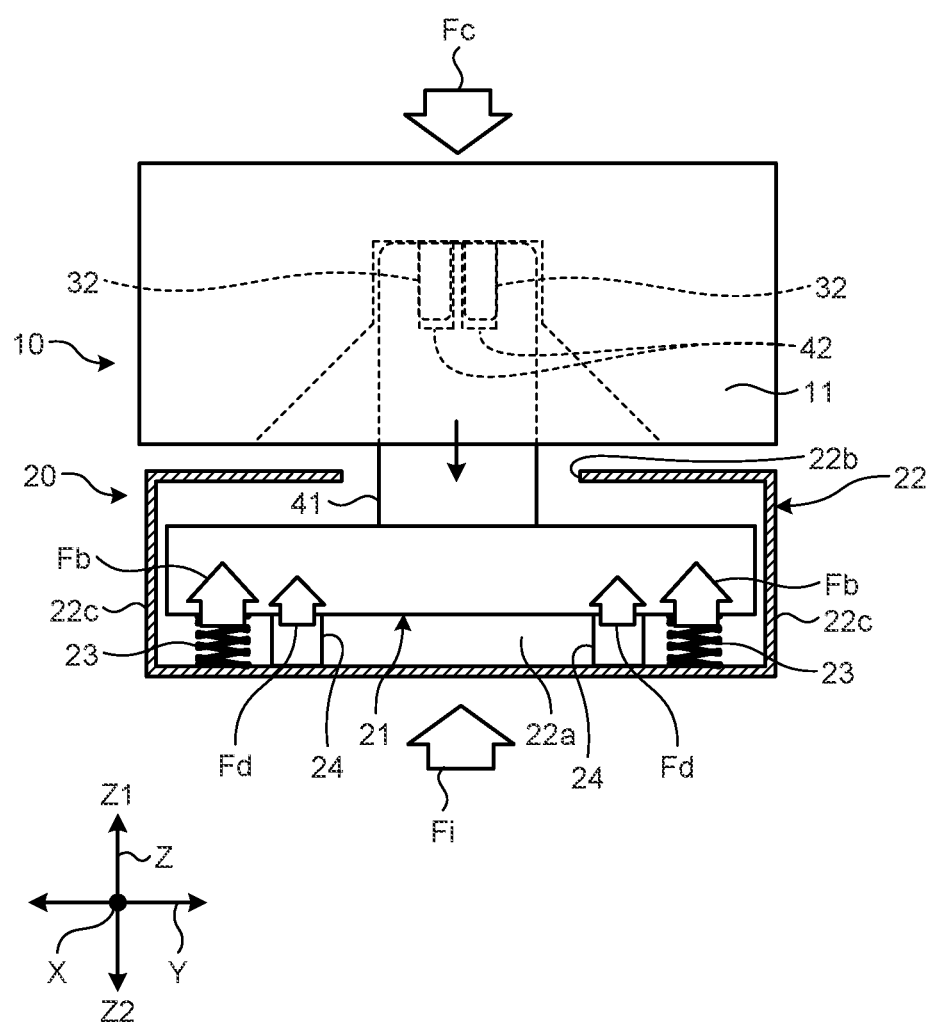
FIG. 9 is a schematic diagram illustrating a fitted state of a first fitting body and a second fitting body in the second embodiment.
Figure 10:
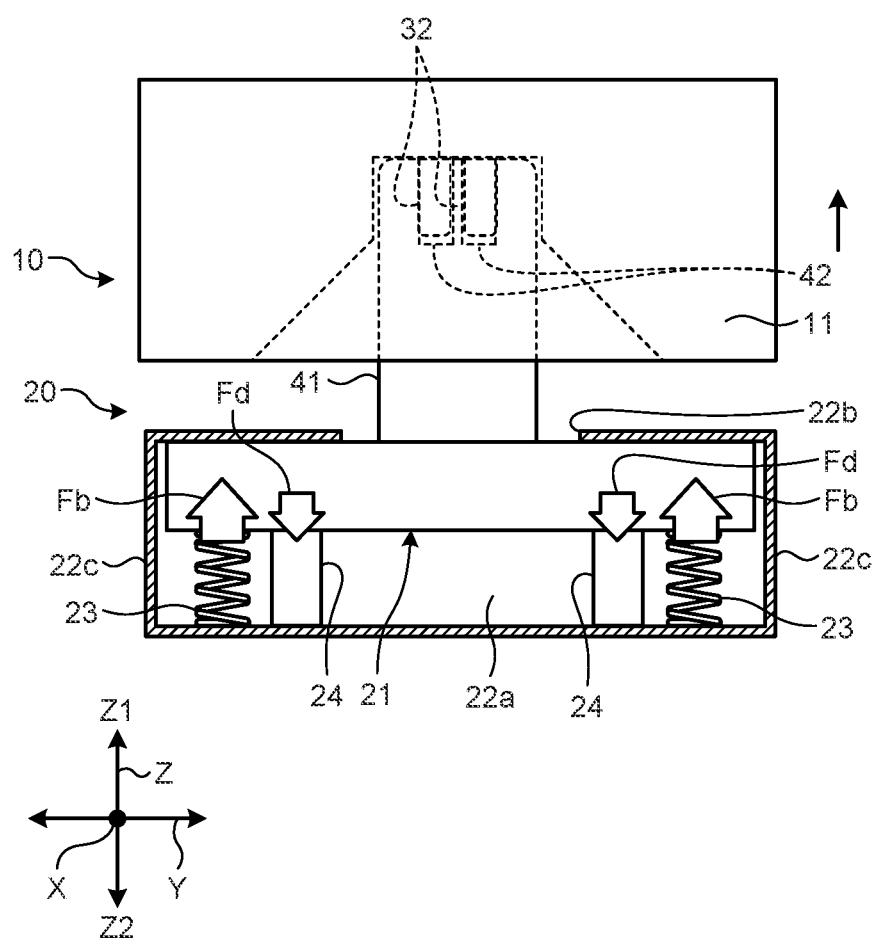
FIG. 10 is a schematic diagram illustrating a fitted state of the first fitting body and the second fitting body when elastic bodies are compressed in the second embodiment.

Next, a vehicle charging system according to a second embodiment will be described with reference to FIGS. 8 to 11. FIG. 8 is a schematic diagram illustrating the schematic configuration of the vehicle charging system according to the second embodiment. FIG. 9 is a schematic diagram illustrating a fitted state of a first fitting body and a second fitting body in the second embodiment. FIG. 10 is a schematic diagram illustrating a fitted state of the first fitting body and the second fitting body when elastic bodies are compressed in the second embodiment. FIG. 11 is a schematic diagram illustrating a fitted state of the first fitting body and the second fitting body when a projection-side electrode holding unit tilts in the second embodiment. The vehicle charging system 1 according to the second embodiment differs from the first embodiment in that a second fitting body 20 includes a damping body 24. Note that, in the following description of the embodiment, redundant description for configurations, actions, and effects common between the second embodiment and the above embodiment will be minimized.

The second fitting body 20 includes the damping body 24 which is disposed between the projection-side electrode holding unit 21 and the housing 22 in the facing direction in the housing space 22a and damps compression of the elastic body 23 in the compression direction and extension of the elastic body 23 in the direction opposite to the compression direction. The damping body 24 of the present embodiment is housed in the housing space 22a and supports the projection-side electrode holding unit 21 in the facing direction. For example, a plurality of damping bodies 24 are disposed between the projection-side electrode holding unit 21 and the housing 22 in the facing direction in the housing space 22a. For example, the damping bodies 24 are disposed on diagonal lines on the inner bottom face of the housing 22 in parallel to the elastic bodies 23. The damping body 24 includes, for example, a gas damper, an oil damper, or a rubber damper. An end, in the compression direction, of the damping body 24 is fixed to the inner bottom face of the housing 22, and an end, in the direction opposite to the compression direction, of the damping body 24 is fixed to the outer bottom face of the projection-side electrode holding unit 21. The damping body 24 damps compression of the elastic body 23 in the compression direction and extension of the elastic body 23 in the direction opposite to the compression direction. The strength of the damping body 24 is set by adjustment. The strength of the damping body 24 is preferably appropriately adjusted because too strong strength of the damping body 24 causes a delay in a height change of the vehicle 2.

Next, an operation of fitting the first fitting body 10 and the second fitting body 20 and a fitted state of the first fitting body 10 and the second fitting body 20 when the elastic bodies are compressed in the vehicle charging system 1 of the second embodiment will be described.

When the vehicle 2 is stopped at the stop position, the elevating unit 7 moves the second fitting body 20 upward. The elevating unit 7, for example, starts driving in accordance with a control signal received from the control unit to raise the second fitting body 20 (FIG. 8).

When fitting of the second fitting body 20 to the first fitting body 10 is started, an apparatus-side load Fi in the upward direction is generated on the second fitting body 20. A spring repulsive force Fb in the upward direction is generated on each of the elastic bodies 23 of the second fitting body 20 in a state where the projection-side electrode holding unit 21 abuts against the inner upper face of the housing 22. A damper repulsive force Fd in the upward direction is generated on each of the damping bodies 24 of the second fitting body 20 in the state where the projection-side electrode holding unit 21 abuts against the inner upper face of the housing 22. When the second fitting body 20 is fitted to the first fitting body 10, a fitting force Fs in the downward direction (compression direction) is generated against the apparatus-side load Fi. At this time, Fs<Fb is satisfied between the fitting force Fs and the spring repulsive force Fb. Thus, the projection-side electrode holding unit 21 does not move in the compression direction, and the second fitting body 20 is fitted to the first fitting body 10. Moreover, the action of the damper repulsive force Fd of the damping body 24 obstructs movement of the projection-side electrode holding unit 21 in the compression direction.

In response to the insertion of the projection 41 into the recess 31, the first electrode member 32 and the second electrode member 42 start making contact with each other. When the second fitting body 20 finishes rising, the insertion of the projection 41 into the recess 31 is completed. As a result, the second fitting body 20 is fitted to the first fitting body 10, and connection between the first electrode member 32 and the second electrode member 42 is completed. When the control unit of the charging apparatus 5 detects the electrical connection between the first electrode member 32 and the second electrode member 42 and detects ignition OFF of the vehicle 2, the control unit starts charging the battery 3 of the vehicle 2.

For example, when the weight of vehicle 2 is increased by loading a load having a weight on the vehicle 2 during charging of the vehicle 2, a load Fc from the vehicle 2 increases, which lowers the first fitting body 10 in the compression direction (FIG. 9). The apparatus-side load Fi and the spring repulsive force Fb remain unchanged before and after the increase in the vehicle weight. Thus, each of the elastic bodies 23 and each of the damping bodies 24 are compressed by the load Fc, which moves the projection-side electrode holding unit 21 in the compression direction from the initial position. In this manner, even if the increase in the vehicle weight reduces the minimum ground clearance H of the vehicle 2 and displaces the connection position between the first fitting body 10 and the second fitting body 20 in compression direction of the facing direction, it is possible to maintain the contact state between the electrode member of the first fitting body 10 and the electrode member of the second fitting body 20 by the projection-side electrode holding unit 21 moving in the compression direction from the initial position. Furthermore, since only the projection-side electrode holding unit 21 moves in the compression direction in the second fitting body 20, it is possible to prevent crush between the first fitting body 10 and the second fitting body 20 and prevent breakdown or damage by suppressing a load in the compression direction applied to the elevating unit 7. In the present embodiment, for example, even if each of the elastic bodies 23 vibrates in the facing direction due to inertia in accordance with the load Fc, the damping body 24 disposed corresponding to the elastic body 23 can suppress the vibration. As a result, it is possible to stably maintain the contact state between the electrode member of the first fitting body 10 and the electrode member of the second fitting body 20.

When the vehicle 2 tilts in the front-rear direction or the width direction in the fitted state where the first fitting body 10 and the second fitting body 20 are fitted with each other, the first fitting body 10 also tilts in the front-rear direction or the width direction together with the vehicle 2. For example, when the first fitting body 10 tilts in the front-rear direction, loads in different directions are applied to the projection-side electrode holding unit 21 including the projection 41 at front and rear thereof in response to the tilt because the projection 41 is inserted in the recess 31. In this case, a load in the compression direction is generated at the front end of the projection-side electrode holding unit 21, and, on the other hand, a load in the direction opposite to the compression direction is generated at the rear end of the projection-side electrode holding unit 21. As a result, among the four elastic bodies 23 disposed between the projection-side electrode holding unit 21 and the housing 22, the two elastic bodies 23 disposed at the front side are compressed by the load in the compression direction, and, on the other hand, the two elastic bodies 23 disposed at the rear side are extended by the load in the direction opposite to the compression direction. Furthermore, among the four damping bodies 24 disposed between the projection-side electrode holding unit 21 and the housing 22, the two damping bodies 24 disposed at the front side are compressed by the load in the compression direction, and, on the other hand, the two damping bodies 24 disposed at the rear side are extended by the load in the direction opposite to the compression direction. Accordingly, when the vehicle 2 tilts in the fitted state, among the plurality of elastic bodies 23, the elastic bodies 23 located at one side in the tilt direction are compressed, and the elastic bodies 23 located at the other side are extended. Thus, only the projection-side electrode holding unit 21 tilts in response to the tilt of the first fitting body 10. Therefore, it is possible to maintain the contact state between the electrode member of the first fitting body 10 and the electrode member of the second fitting body 20. Furthermore, the damping bodies 24 corresponding to the compressed elastic bodies 23 located at the one side can suppress vibrations of the elastic bodies 23 caused by inertia.

The vehicle charging system 1 according to the second embodiment described above includes the second fitting body 20 including the damping body 24 which is disposed between the projection-side electrode holding unit 21 and the housing 22 in the facing direction in the housing space 22a and damps compression of the elastic body 23 in the compression direction and extension of the elastic body 23 in the direction opposite to the compression direction. With this configuration, for example, even if the minimum ground clearance H of the vehicle 2 suddenly changes, the damping body 24 damps the compression and extension of the elastic body 23 in response to the change in the minimum ground clearance H. Thus, it is possible to maintain the contact state between the electrode member of the first fitting body 10 and the electrode member of the second fitting body 20 and stably perform charging.

Note that although, in the above first and second embodiments, the first fitting body 10 is mounted on the vehicle 2, and the second fitting body 20 is located at the ground surface 8 side and disposed at the position facing the first fitting body 10 in the facing direction when the vehicle 2 is stopped, the present invention is not limited thereto. For example, the second fitting body 20 may be mounted on the vehicle 2, and the first fitting body 10 may be located at the ground surface 8 side and disposed at the position facing the second fitting body 20 in the facing direction when the vehicle 2 is stopped.

Although, in the above first and second embodiments, the connection position between the first fitting body 10 and the second fitting body 20 is set on the basis of the minimum ground clearance H specific to the vehicle 2, the present invention is not limited thereto. For example, in order to make the connection position between the first fitting body 10 and the second fitting body 20 correspond to a plurality of vehicle types having different minimum ground clearances H, the connection position may be set according to the highest minimum ground clearance H among the plurality of vehicle types.

Although, in the above first and second embodiments, the recess 31 and the projection 41 have an elliptical (or oval) shape when viewed in the facing direction, the present invention is not limited thereto. The recess 31 and the projection 41 may have a circular shape.

Although, in the above first and second embodiments, the opening 22b allows movement of the projection 41 in the plane direction and also restricts movement of the projection 41 in the plane direction, the present invention is not limited thereto. For example, the opening 22b may allow tilt of the projection 41 and also restrict tilt of the projection 41.

Although, in the above first and second embodiments, the recess 31 includes the first electrode member 32 disposed inside thereof, and the projection 41 holds the second electrode member 42 inside thereof, the present invention is not limited thereto. For example, the recess 31 may include the second electrode member 42 disposed inside thereof, and the projection 41 may hold the first electrode member 32 inside thereof.

Although, in the above first and second embodiments, the support unit 33 includes, for example, the metal coil springs which are disposed on the projection 41 at both ends in the width direction (X direction) and both ends in the front-rear direction (Y direction), the present invention is not limited thereto.

Although, in the above first and second embodiments, the elastic body 23 and the damping body 24 are separated from each other, the elastic body 23 and the damping body 24 may be integrated with each other.

Although the above first and second embodiments describe the case where the vehicle weight increases during charging of the vehicle 2, the present invention is not limited thereto. For example, the present invention may be applied to a case where the vehicle weight changes in such a manner that the vehicle 2, which is a commercial vehicle, moves out from the parking lot after completion of charging and comes into the parking lot after a load is loaded thereon, and charging is again performed thereafter.

Although, in the above first and second embodiments, the present invention is applied to the vehicle, the application of the present invention is not limited to the vehicle. For example, the present invention may be applied to an electric bicycle (including an electric power-assisted bicycle), or may be applied to an electric vehicle, a vacuum cleaner, or a humanoid or animal walking robot which automatically travels.

The vehicle charging system according to the present embodiment achieves an effect capable of maintaining the contact state between electrodes with a simple configuration even if there is a change in a minimum ground clearance based on a change in a vehicle weight.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle charging system comprising:
   a first fitting body including a first electrode member;
   a second fitting body including a second electrode member connectable to the first electrode member in a state where the second fitting body is fitted with the first fitting body;
   a support unit configured to support the second fitting body movably in a plane direction within a predetermined range from a reference position in response to application of an external force to the second fitting body and return the second fitting body to the reference position in response to removal of the external force; and
   an elevating unit configured to move the second fitting body from a standby position to a connection position in a state where the first fitting body and the second fitting body face each other in a facing direction perpendicular to the plane direction to fit the second fitting body to the first fitting body, wherein
   one of the first fitting body and the second fitting body is mounted on a vehicle,
   another one of the first fitting body and the second fitting body is disposed at a position facing the one fitting body in the facing direction when the vehicle is stopped,
   the other fitting body includes
      a projection-side electrode holding unit including a projection, the projection holding one of the first electrode member and the second electrode member inside the projection and projecting in the facing direction facing the one fitting body, and
      an elastic body supporting the projection-side electrode holding unit in the facing direction and elastically deformable in a compression direction, the compression direction being one direction of the facing direction,
   the one fitting body includes a recess-side electrode holding unit including a recess, the recess being recessed in a direction opposite to the compression direction, including the other of the first electrode member and the second electrode member disposed inside the recess, and being configured to receive the projection of the projection-side electrode holding unit, and
   the elastic body moves the projection-side electrode holding unit in the compression direction from an initial position by being compressed by a load in the compression direction applied to the projection-side electrode holding unit and moves the projection-side electrode holding unit to the initial position by being restored when the load is removed.

2. The vehicle charging system according to claim 1, wherein
   the other fitting body includes a damping body, the damping body supporting the projection-side electrode holding unit in the facing direction and being configured to damp compression of the elastic body in the compression direction and extension of the elastic body in the direction opposite to the compression direction.

3. The vehicle charging system according to claim 1, wherein
   the other fitting body includes a housing including a housing space, the housing space communicating with outside through an opening opened in the facing direction facing the one fitting body and housing the projection-side electrode holding unit in an inserted state where a tip of the projection is inserted through the opening, and
   the housing allows movement of the projection-side electrode holding unit in the facing direction and restricts movement of the projection-side electrode holding unit in the plane direction.

4. The vehicle charging system according to claim 2, wherein
   the other fitting body includes a housing including a housing space, the housing space communicating with outside through an opening opened in the facing direction facing the one fitting body and housing the projection-side electrode holding unit in an inserted state where a tip of the projection is inserted through the opening, and
   the housing allows movement of the projection-side electrode holding unit in the facing direction and restricts movement of the projection-side electrode holding unit in the plane direction.

5. The vehicle charging system according to claim 3, wherein a clearance is left between the projection-side electrode holding unit and the housing in the plane direction so as to allow the projection-side electrode holding unit to tilt with respect to the facing direction.

6. The vehicle charging system according to claim 1, wherein
   the one fitting body includes a guide surface, the guide surface being coupled to the recess, being inclined to a side opposite to the recess in the plane direction as extending in the compression direction, and being configured to guide the projection to the recess.

7. The vehicle charging system according to claim 2, wherein
   the one fitting body includes a guide surface, the guide surface being coupled to the recess, being inclined to a side opposite to the recess in the plane direction as extending in the compression direction, and being configured to guide the projection to the recess.

8. The vehicle charging system according to claim 3, wherein
   the one fitting body includes a guide surface, the guide surface being coupled to the recess, being inclined to a side opposite to the recess in the plane direction as extending in the compression direction, and being configured to guide the projection to the recess.

9. The vehicle charging system according to claim 5, wherein
   the one fitting body includes a guide surface, the guide surface being coupled to the recess, being inclined to a side opposite to the recess in the plane direction as extending in the compression direction, and being configured to guide the projection to the recess.

* * * * *